United States Patent
Petricek

(10) Patent No.: US 8,000,117 B2
(45) Date of Patent: Aug. 16, 2011

(54) BUCK BOOST FUNCTION BASED ON A CAPACITOR BOOTSTRAP INPUT BUCK CONVERTER

(75) Inventor: Shea Petricek, Dallas, TX (US)

(73) Assignee: Intersil Americas Inc., Milpitas, CA (US)

( * ) Notice: Subject to any disclaimer, the term of this patent is extended or adjusted under 35 U.S.C. 154(b) by 17 days.

(21) Appl. No.: 12/480,823

(22) Filed: Jun. 9, 2009

(65) Prior Publication Data

US 2010/0039085 A1     Feb. 18, 2010

Related U.S. Application Data

(60) Provisional application No. 61/088,610, filed on Aug. 13, 2008.

(51) Int. Cl.
*H02M 3/18* (2006.01)

(52) U.S. Cl. .......................................... 363/60; 323/266
(58) Field of Classification Search .................... 363/59, 363/60; 323/266; 327/535, 536
See application file for complete search history.

(56) References Cited

U.S. PATENT DOCUMENTS

| | | | |
|---|---|---|---|
| 6,518,830 B2 * | 2/2003 | Gariboldi et al. | 327/536 |
| 6,937,487 B1 * | 8/2005 | Bron | 363/60 |
| 7,777,459 B2 * | 8/2010 | Williams | 323/266 |

* cited by examiner

*Primary Examiner* — Shawn Riley
(74) *Attorney, Agent, or Firm* — Howison & Arnott, LLP

(57) ABSTRACT

A buck boost voltage converter circuit has a capacitor pump circuit for boosting an input voltage in a first mode of operation when an input voltage is below a desired voltage level. A buck converter circuit provides the output voltage responsive to the boosted input voltage from the capacitor pump circuit in the first mode of operation and provides the output voltage responsive to the input voltage in a second mode of operation when the input voltage is above the desired voltage level.

16 Claims, 6 Drawing Sheets

BUCK BOOST FUNCTION BASED ON A CAPACITOR BOOTSTRAP INPUT BUCK CONVERTER

CROSS-REFERENCE TO RELATED APPLICATIONS

This application claims priority to U.S. Provisional Patent Application No. 61/088,610, filed Aug. 13, 2008, titled BUCK BOOST FUNCTION BASED ON CAPACITOR BOOTSTRAP INPUT BUCK which is incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
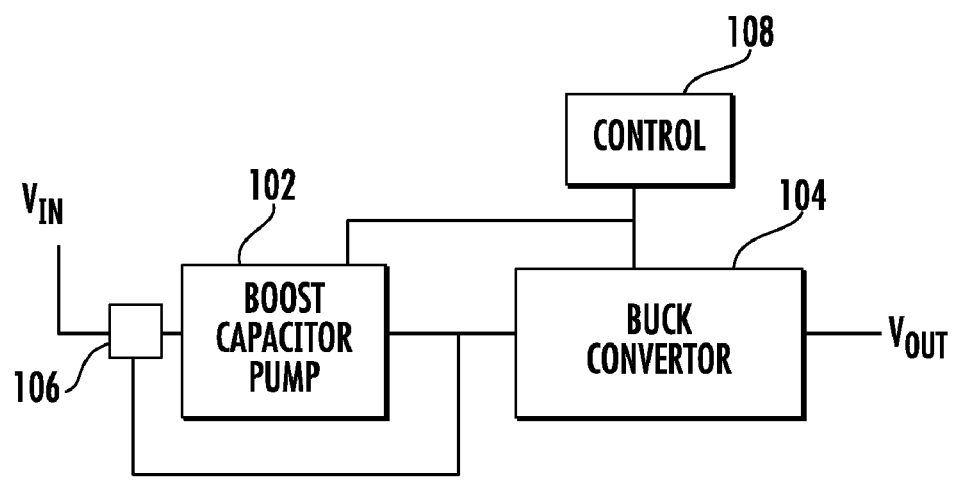
FIG. 1 is a block diagram of the converter including a boost pump portion and a buck converter portion.

Referring now to the drawings, wherein like reference numbers are used herein to designate like elements throughout, the various views and embodiments of a buck boost function based on capacitor bootstrap input buck converter are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Many electronic devices require voltage rails that fall above or below the input voltage range of the electronic device. With common 5 volt and 3.3 volt rails, systems are often required to run from a battery source and an AC adapter source. This may cause a situation where the voltage rails are above and/or below the input voltage. Various approaches have been utilized to solve this problem such as two stage architectures wherein a first stage boosts the input voltage to some point above the required output voltage and a second stage steps the boosted voltage back down to a desired output voltage. Another approach uses the common SEPIC converter. Both solutions incur efficiency or component count/size penalties. Some designers have begun to utilize the basic H-bridge configuration from a single inductor to generate a buck/boost capability in a single step. Current solutions suffer from either large size, high output voltage ripple currents or poor transient response/difficulty in control.

Referring now to the drawings, and more particularly to FIG. 1, there is illustrated a buck boost converter configuration including a capacitor pump 102 and a buck converter 104. An input voltage $V_{IN}$ is applied through some type of switching circuitry 106 to the capacitor pump 102. The input voltage $V_{IN}$ is applied to the buck converter circuitry 104 either through the capacitor pump 102 or directly from the switching circuitry 106, and an output voltage $V_{OUT}$ is generated within the buck converter 104. The capacitor pump 102 uses a capacitive doubler arrangement to feed the buck converter circuitry 104 when the input voltage $V_{IN}$ is lower than the output voltage $V_{OUT}$. This configuration enables the generation of common 5/3.3 system rails from a single cell lithium ion voltages. The circuitry also provides a very low $V_{OUT}$ ripple. As more fully described in FIG. 2 herein below, the circuitry requires 5 switches rather than the 4 switches required within H-bridge topologies but the overall RMS switch current may be comparable to that of the H-bridge topology.

Figure 2:
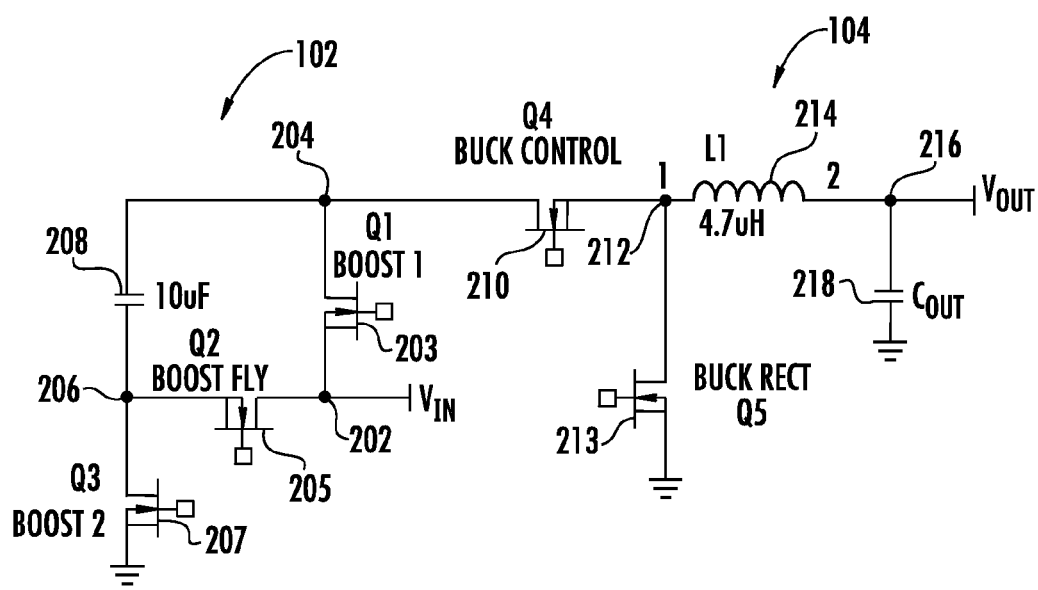
FIG. 2 is a schematic diagram of the buck boost converter topology including a capacitor pump.

FIG. 2 illustrates a schematic diagram of the buck boost configuration of the present disclosure including the pump circuit 102 and buck converter 104. The input voltage $V_{IN}$ is applied at node 202. A transistor 203 has its drain/source path connected between node 204 and node 202. The gate of transistor 203 is connected to receive control signals for controlling the operation of the buck boost converter as will be more fully described herein below. The control signals to the gate of the transistor 203 are provided from the control circuitry 108. A transistor 205 has its source/drain path connected between node 206 and node 202. The gate of transistor 205 also receives control signals from the control circuit 108. A transistor 207 has its drain/source path connected between node 206 and ground. A capacitor 208 is connected between node 204 and 206. The capacitor 208 in one embodiment may be a low cost ceramic capacitor. The capacitor 208 and transistors 203, 205 and 207 comprise the pump portion of the buck boost converter circuit.

The buck converter portion 104 is connected to the pump portion 102 at node 204 via a high-side transistor 210 having its drain/source path connected between node 204 and node 212. The gate of transistor 210 receives control signals from the control circuit 108. A low-side transistor 213 has its drain/source path connected between node 212 and ground. The inductor 114 of the buck converter circuit 104 is connected between node 212 and 216. An output capacitance 218 COUT is connected between node 216 and ground. Node 216 comprises the output voltage nodes of the buck converter 104 and provides the output voltage $V_{OUT}$.

Figure 3:
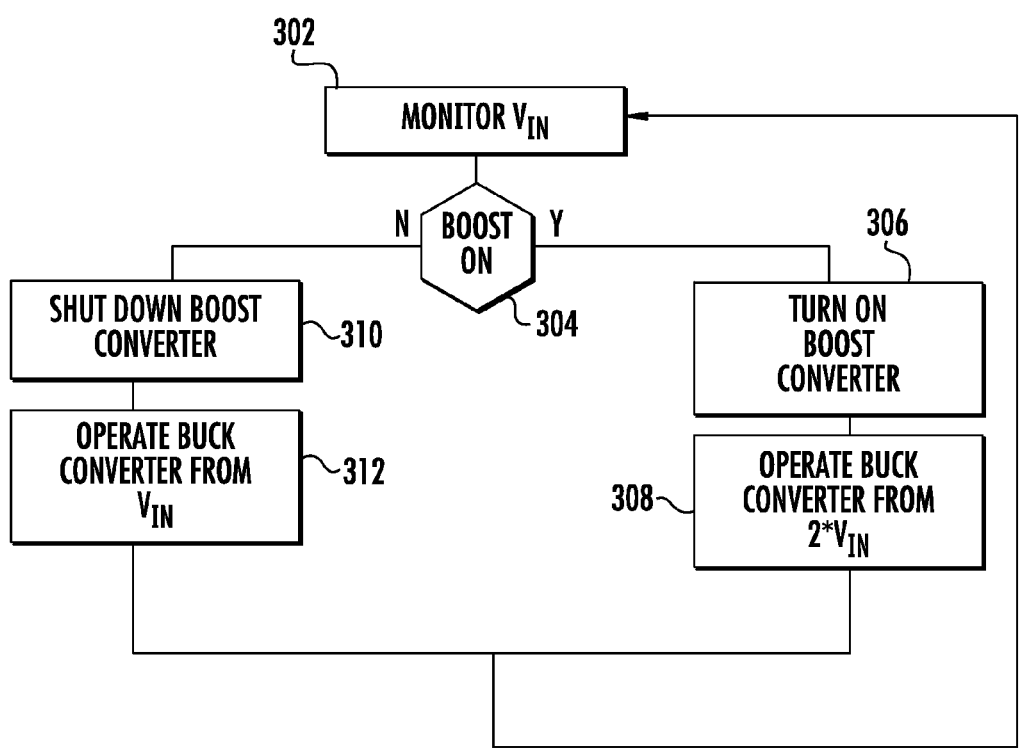
FIG. 3 is a flow diagram describing a first method of operation of the circuit of FIG. 2.

Referring now to FIG. 3, there is illustrated a flow diagram describing A generalized control method for providing control signals to the switching transistors of the capacitor pump 102 and buck converter 104 from the control circuitry 108 for one use of the circuit. The unregulated capacitor pump 102 enables high efficiency and can provide an effective output voltage $V_{OUT}$ of two times the input voltage $V_{IN}$. While various modulation schemes may be used by the control circuitry 108 for controlling the transistors within the boost capacitor pump 102 and buck converter 104. Using the scheme illustrated in FIG. 3, within a simple modulation process, transistor 205 and transistor 210 may be operated in unison when the input voltage $V_{IN}$ is deemed to be too low. Under the same conditions, transistors 203, 207 and 213 may also be operated in unison. This causes the circuitry to operate as a traditional buck converter operating to provide an output voltage from an input voltage approximately twice the actual source voltage VIN. Thus, after the input voltage is monitored at step 302, inquiry step 304 determines whether the boost converter circuitry should be turned on. In one embodiment, this may be based on whether the input voltage $V_{IN}$ is greater than a predetermined level or range X. Other determinations may be used to determine whether the boost circuitry is needed. If the boost mode is required, the boost converter (i.e., the capacitor pump 102) is turned on at step 306 and the buck converter will then operate to provide an output voltage responsive to the voltage provided by the boost converter at node 204. The boost circuitry is operated by turning on transistors 203 and 207 while turning off transistor 205 to charge the capacitor 208 up to the voltage $V_{IN}$. In the second stage of operation, the transistor 205 is turned on while transistors 203 and 207 are turned off. This causes a voltage of $2 V_{IN}$ to be applied at node 204 responsive to the input voltage and the voltage charge on capacitor 208. Transistor 210 will be turned on when transistor 205 is turned on such that the voltage at node 204 may be applied at the phase node 212. The transistor 210 is turned off when the capacitor 208 is being charged. The exact voltage provided at the phase node 212 may be established by controlling the duty cycle applied to the switching transistors 210 and 213. This would enable the selection of the voltage somewhere between $V_{IN}$ and $2 V_{IN}$.

When inquiry step 304 determines that the boost mode is not needed, transistor 205 is turned off and transistors 203 and 207 are turned on. This shuts down the capacitor pump operation at step 310 enabling the buck converter to provide a regulated voltage at step 312 responsive to the input voltage $V_{IN}$ rather than twice $V_{IN}$. This modulation scheme is simple but incurs a higher total RMS switch current than a four switch H-bridge converter circuit. The circuit of FIG. 2 is also more forgiving than an H-bridge circuit if a current mode buck control scheme is used. Diode emulation may be easily implemented within the circuitry as more fully described herein below with respect to FIG. 4.

Figure 4:
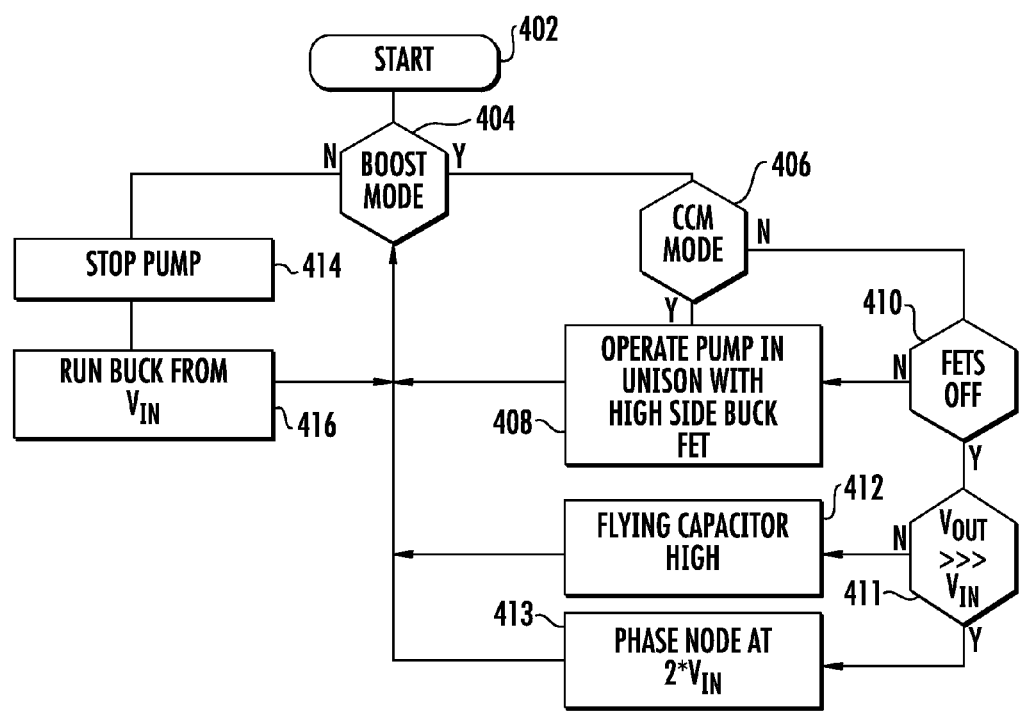
FIG. 4 is a flow diagram describing the operation of the circuit of FIG. 1 using diode emulation.

FIG. 4 illustrates a basic operation of the circuit of FIG. 2 for another application of the circuit using diode emulation. The process is initiated at step 402 and inquiry step 404 determines if the boost mode is necessary to responsive to the input voltage. In a preferred embodiment, the predetermined voltage level may be 6 volts; however any voltage level may be utilized. If inquiry step 404 determines that the input voltage is not adequate, inquiry step 406 determines whether the circuit is operating in a continuous current mode of operation. When the circuit is operating in the continuous current mode of operation, the pump circuit 102 is operated in unison with the high-side switching transistor 210 of the buck converter 104. This causes the buck converter 104 to receive twice the input voltage $V_{IN}$ at its input at node 204 when transistor 210 and transistor 205 are both turned on while transistors 203 and 207 are turned off. If inquiry step 406 determines that the circuitry is not operating within a continuous current mode of operation, inquiry step 410 determines whether each of the transistors within the buck converter 104 is turned "off." When each of the transistors 210 or 213 are in the "off" state, the buck converter 104 is within the diode emulation mode. In the diode emulation mode, inquiry step 411 determines if Vout is substantially higher than VIN. If so, switch 210 remains off and switch 205 is turned on such that the phase node 104 is "parked" at 2*VIN at step 413 during the diode emulation portion of the cycle. If this is not done, the VOUT higher than VIN condition could cause reverse inductor current thru the MOSFET body diode of switch 210 even though it is "off". Of course if the switch type can block current flow in both directions then the need to park phase node 104 at 2*VIN is removed. If Vout is not substantially higher than VIN, the operation of the capacitor pump 102 is modified at step 412 such that the capacitor 208 is charged to a voltage $V_{IN}$. If both transistors of the buck converter 104 are not turned off, as determined at inquiry step 410, the system operates in a similar fashion that it does when in the continuous current mode, and the pump circuitry 102 is operated in unison with the high-side buck transistor 210 as described previously. The pump circuit frequency is always the same as the buck converter frequency. From steps 408 and 412 control passes back to inquiry step 404.

If inquiry step 404 determines that the boost mode is not needed, the operation of the pump circuitry (boost converter) 102 is stopped at step 414 by turning off the transistors 203 and 205, and the buck converter 104 is allowed to run from the input voltage $V_{IN}$ at step 416. Control passes from step 416 back to the inquiry step 404. Simple modulation schemes for the transistors of the pump circuit 102 and buck converter 104 lead to an overall higher RMS current within the circuit when the pump is operating.

Figure 5:
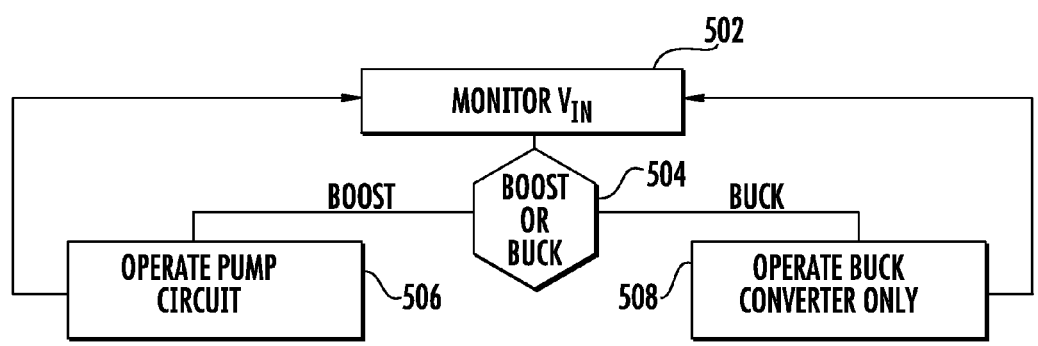
FIG. 5 is a flow diagram describing a second method for controlling the operation of the circuitry of FIG. 2.

In an alternative modulation scheme, the pump and buck circuitries are operated separately, and the transistors within the circuits are not operated in unison. A flow diagram illustrating one alternative manner of operation is illustrated in FIG. 5. The input voltage at $V_{IN}$ is monitored at step 502. A boost or buck mode determination is made at step 504 based on, for example, $V_{IN}$, however other parameters may be used. When the input voltage $V_{IN}$ is lower than a desired level, only the pump circuit is operated with the buck regulator at step 506 by turning on transistor 210. This causes the phase voltage to swing between $V_{IN}$ and two times $V_{IN}$ responsive to the operations of the buck converter 104 and pump circuit 102. When inquiry step 504 determines that the input voltage is not lower than a desired level, only the buck converter circuitry 104 is operated at step 508.

The buck boost converter described herein above uses a capacitive doubler arrangement to feed a buck power circuit 104 when the input voltage $V_{IN}$ is lower than a desired level. This configuration enables the generation of common 5/3.3 volt system rails from single lithium ion voltages. The circuit provides a very low output voltage ripple. Compared to the H-bridge topology, the circuit uses 5 switches instead of 4 switches but the overall RMS current is not higher.

Figure 6:
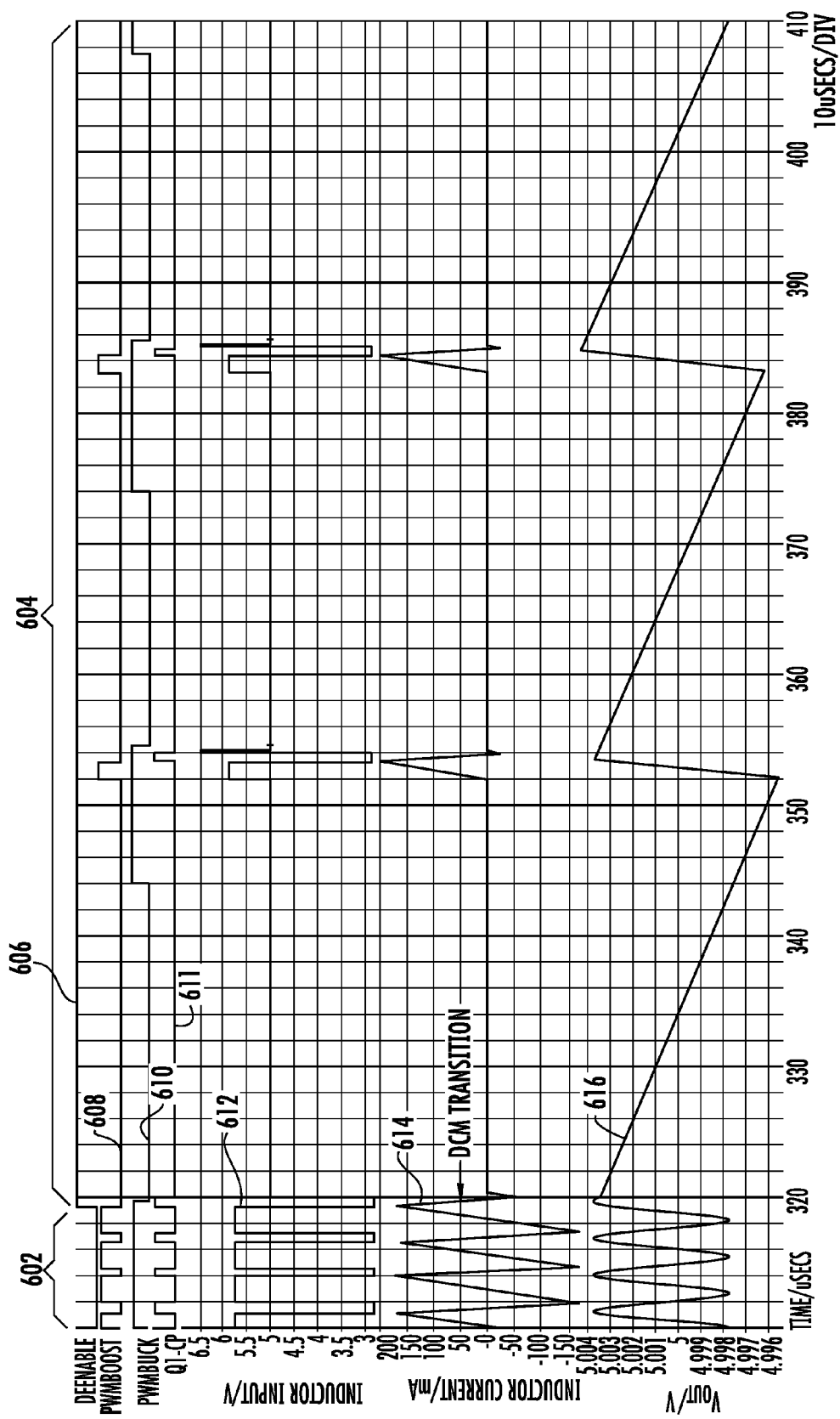
FIG. 6 illustrates various waveforms within the circuit of FIG. 2 in both the CCM and DCM modes of operation.

FIG. 6 illustrates various waveforms associated with the CCM and DCM modes of operation for the circuitry of FIG. 2. The CCM mode of operation is indicated generally at 602. The DCM mode of operation is illustrated generally at 604. The enable signal 606 goes high with the initiation of the DCM transition period. The PCM boost signal is illustrated generally at 608. The PWM buck signal is illustrated at 610. Waveform 612 illustrates the inductor input voltage while waveform 614 illustrates the inductor current. The output voltage in the continuous current mode and discontinuous current mode is illustrated by the waveform 616. The Q1-CP waveform 611 illustrates the control signal for transistor Q1 203.

It will be appreciated by those skilled in the art having the benefit of this disclosure that this buck boost function based on capacitor bootstrap input buck converter provides improved voltage regulation circuit characteristics. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A buck boost voltage converter circuit, comprising:
a capacitor pump circuit for boosting an input voltage in a first mode of operation when an input voltage is below a desired level; and
a buck converter circuit for providing the output voltage responsive to the boosted input voltage from the capacitor pump circuit in the first mode of operation and for providing the output voltage responsive to the input voltage in a second mode of operation when the input voltage is above the desired level wherein the buck converter circuit further comprises:
 a high side switching transistor connected to receive either the input voltage or the boosted input voltage;
 a low side switching transistor connected between the high side switching transistor and ground;
 an inductor connected between the high side switching transistor and an output node; and
 an output capacitor connected between the output node and ground;
 wherein the capacitor pump circuit is operated in unison with the high side switching transistor to provide twice the input voltage when the high-side switching transistor is turned on in the first mode of operation and to provide the input voltage when the high-side switching transistor is turned off in the first mode of operation.

2. The buck boost voltage converter circuit of claim 1, wherein the boosted input voltage is approximately twice the input voltage.

3. The buck boost voltage converter circuit of claim 1, wherein the capacitor pump circuit is enabled in the first mode of operation and disabled in the second mode of operation.

4. The buck boost voltage converter circuit of claim 1, wherein the capacitor pump circuit further comprises:
 a first transistor connected between an input voltage node for receiving the input voltage and an output node of the capacitor boost circuit connected to the high side switching transistor;
 a second transistor connected in series with the first transistor;
 a third transistor connected between the second transistor and the ground; and
 a capacitor connected between the third transistor and the output node.

5. The buck boost voltage converter circuit of claim 4, wherein the second transistor is always turned on to disable the capacitor pump circuit.

6. The buck boost voltage converter circuit of claim 1, wherein the capacitor pump circuit is enabled and the buck converter is disabled if the input voltage is lower than the desired level and the capacitor pump circuit is disabled and the buck converter is enabled if the input voltage is higher than the desired level.

7. A method for providing a regulated output voltage responsive to an input voltage, comprising the steps of:
comparing the input voltage to a desired voltage level;
boosting the input voltage in a first mode of operation when an input voltage is below the desired voltage level using a capacitor pump circuit;
generating the output voltage responsive to the boosted input voltage in the first mode of operation using a buck converter;
generating the output voltage responsive to the input voltage in a second mode of operation when the input voltage is above the desired voltage level using the buck converter;
enabling the capacitor pump circuit in the first mode of operation; and
disabling the buck converter in the second mode of operation.

8. The method of claim 7, wherein the step of boosting the input voltage comprises the step of boosting the input voltage to approximately twice the input voltage.

9. The method of claim 7, further including the steps of to provide twice the input voltage when the high-side switching transistor is turned on in the first mode of operation and to provide the input voltage when the high-side switching transistor is turned off in the first mode of operation.

10. The method of claim 7, further including the steps of:
determining if the input voltage is higher or lower than the desired voltage level;
enabling the capacitor pump circuit and disabling the buck converter if the input voltage is lower than the desired voltage level; and
disabling the capacitor pump circuit and enabling the buck converter if the input voltage is higher than the desired voltage level.

11. A buck boost voltage converter circuit, comprising:
a capacitor pump circuit for boosting an input voltage to approximately twice the input voltage in a first mode of operation when an input voltage is below a desired voltage level, wherein the capacitor pump circuit further comprises:
 a first transistor connected between an input voltage node for receiving the input voltage and an output node of the capacitor boost circuit connected to the high side switching transistor;
 a second transistor connected in series with the first transistor;
 a third transistor connected between the second transistor and the ground; and
 a capacitor connected between the third transistor and the output node; and
 wherein the capacitor pump circuit is enabled in the first mode of operation and disabled in the second mode of operation;
a buck converter circuit for providing the output voltage responsive to the boosted input voltage from the capacitor pump circuit in the first mode of operation and for providing the output voltage responsive to the input voltage in a second mode of operation when the input voltage is above the desired voltage level, wherein the buck converter circuit further comprises:
 a high side switching transistor connected to receive either the input voltage or the boosted input voltage;
 a low side switching transistor connected between the high side switching transistor and ground;
 an inductor connected between the high side switching transistor and an output node; and
 an output capacitor connected between the output node and ground.

12. The buck boost voltage converter circuit of claim 11, wherein the capacitor pump circuit is operated in unison with the high side switching transistor to provide twice the input voltage when the high-side switching transistor is turned on in the first mode of operation and to provide the input voltage when the high-side switching transistor is turned off in the first mode of operation.

13. The buck boost voltage converter circuit of claim 11, wherein the second transistor is always turned on to disable the capacitor pump circuit

14. The buck boost voltage converter circuit of claim 11, wherein the boosted input voltage is approximately twice the input voltage.

15. The buck boost voltage converter circuit of claim 11, wherein the capacitor pump circuit is enabled in the first mode of operation and disabled in the second mode of operation.

16. The buck boost voltage converter circuit of claim 11, wherein the capacitor pump circuit is enabled and the buck converter is disabled if the input voltage is lower than the desired level and the capacitor pump circuit is disabled and the buck converter is enabled if the input voltage is higher than the desired level.

* * * * *